United States Patent [19]
Atkinson

[11] Patent Number: 5,131,290
[45] Date of Patent: Jul. 21, 1992

[54] STEERING WHEEL COVER

[76] Inventor: Chad Atkinson, 940 E. Grove Creek Dr., Pleasant Grove, Utah 84062

[21] Appl. No.: 613,282

[22] Filed: Nov. 15, 1990

[51] Int. Cl.⁵ ............................ G05G 1/04; A44B 1/04
[52] U.S. Cl. .................................... 74/558.5; 74/558; 24/115 G
[58] Field of Search ............................ 74/558, 558.5; 24/115 GX, 132 AA, 136 R, 72.5, 72.7

[56] References Cited

U.S. PATENT DOCUMENTS

| | | | |
|---|---|---|---|
| 1,538,147 | 5/1925 | Trench et al. | 74/558 |
| 1,633,988 | 6/1927 | Jones | 74/558.5 |
| 1,997,738 | 4/1935 | Maxedon et al. | 74/558.5 |
| 2,601,881 | 7/1952 | Oberlin | 74/558.5 |
| 2,751,957 | 6/1956 | Langerman | 74/558.5 |
| 2,776,582 | 1/1957 | Blades | 74/558.5 |
| 3,080,867 | 3/1963 | Eichinger | 24/115 G |
| 4,126,169 | 11/1978 | Magnuson et al. | 74/558 X |
| 4,308,906 | 1/1982 | Bula et al. | 24/115 G |
| 4,716,608 | 1/1988 | Whifield | 24/72.5 |
| 4,789,070 | 12/1988 | Bennett | 24/115 G X |
| 4,993,281 | 2/1991 | Miller | 74/558 X |
| 5,016,306 | 5/1991 | Grivna et al. | 24/136 R X |

FOREIGN PATENT DOCUMENTS

| | | | |
|---|---|---|---|
| 684481 | 11/1939 | Fed. Rep. of Germany | 74/558 |
| 2106841 | 4/1983 | United Kingdom | 74/558 |

Primary Examiner—Vinh T. Luong
Attorney, Agent, or Firm—Andrew C. Hess

[57] ABSTRACT

A steering wheel cover is removable and adjustable to fit different sizes of steering wheels. Once adjusted to fit a particular size of steering wheel, the steering wheel cover can be placed upon and removed from the steering wheel without altering the adjustment setting. The steering wheel cover comprises a cover member which substantially encloses a steering wheel and is retained over the steering wheel by a shock cord which is slidably attached to the peripheral edge of the cover member. The length of the shock cord is adjusted through the use of a barrel lock placed on the shock cord.

10 Claims, 2 Drawing Sheets

STEERING WHEEL COVER

BACKGROUND OF THE INVENTION

1. Field

The invention relates to steering wheel covers, particularly steering wheel covers which are removed when the steering wheel is in use. The illustrated embodiment is a snugly-fitting steering wheel cover which protects the steering wheel from solar radiation damage, thermal damage and elevated temperatures, and is removable and adjustable to fit different sizes of steering wheels and, once adjusted to particular size of steering wheel, can be placed upon and removed from the steering wheel without altering the adjustment setting

2. State of the Art

Various types and designs of steering wheel covers are known in the prior art. Prior art steering wheel covers generally fall into two categories The first category of prior art steering wheel covers are those which are intended for non-removable attachment to the steering wheel, are left on the steering wheel when the steering wheel is in use, and are generally designed and used for the purpose of increasing a driver's physical comfort when using the steering wheel and maximizing the driver's grip on the steering wheel. These steering wheel covers are placed on an outer ring of a steering wheel, form a tubular structure around the outer ring of the steering wheel, and are generally attached to the steering wheel through a mechanical means such as lacing or an interlocking clip mechanism.

Prior art patents which are illustrative of this first category of steering wheel covers are as follows: U.S. Pat. No. 1,530,060, issued Mar. 17, 1925 to W. F. Ridge; U.S. Pat. No. Des. 97,231, issued Oct. 15, 1935 to F. P. Jackson; U.S. Pat. No. 2,157,950, issued May 9, 1939 to F. A. Best; U.S. Pat. No. 2,172,584, issued Sep. 12, 1939 to A. J. Iller; U.S. Pat. No. 2,197,409, issued Apr. 16, 1940 to F. P. Jackson; U.S. Pat. No. 2,309,374, issued Jan. 26, 1943 to S. Alexander; U.S. Pat. No. 2,618,987, issued Nov. 25, 1952 to L. M. Goldstine; U.S. Pat. No. 3,319,486, issued May 16, 1967 to R. C. Spencer; U.S. Pat. No. 3,945,416, issued Mar. 23, 1976 to H. Y. Rim; U.S. Pat. No. 4,179,950, issued Dec. 25, 1979 to J. F. Valley; U.S. Pat. No. 4,441,382, issued Apr. 10, 1984 to L. K. Snooks; U.S. Pat. No. Des. 280,314, issued Aug. 27, 1985 to M. Strongwater; U.S. Pat. No. 4,581,954, issued Apr. 15, 1986 to S. Uchida; U.S. Pat. No. 4,729,416, issued Mar. 8, 1988 to D. J. Miller; and U.S. Pat. No. 4,800,776, issued Jan. 31, 1989 to M. Strongwater.

The second category of prior art steering wheel covers are those which are designed to be removed from the steering when the steering wheel is in use and are utilized primarily to protect the steering wheel from solar radiation damage, thermal damage and elevated temperatures. The present invention relates to this second category of steering wheel covers.

Prior art patents which are illustrative of this second category of steering wheel covers are as follows: U.S. Pat. No. 4,102,377, issued Jul. 25, 1978 to N. M. Ostrem and U.S. Pat. No. 4,685,499, issued Aug. 11, 1987 to T. W. Black. These prior art patents generally teach steering wheel covers constructed of a rigid or semi-rigid material, such as cardboard or foam backed fabric, and, therefore, generally retain their shape when removed from the steering wheel and are difficult to store when not in use. These prior art steering wheel covers are also disadvantageous because they are not easily cleaned, are not adjustable to different sizes of steering wheels and are not asthetically pleasing.

SUMMARY OF THE INVENTION

Objectives

It is an objective of the invention to provide a steering wheel cover which protects the steering wheel from the harmful effects of solar radiation and thermal damage and keeps the steering wheel in a comfortable temperature zone. Another objective of the invention is to provide a steering wheel cover which is adjustable to different sizes of steering wheels, and, once adjusted, can be applied to and removed from the steering wheel without alteration of the size adjustment. Other objectives of the invention are to provide a steering wheel cover that is washable and is made of a liable material so that it is collapsible and can be folded into a compact figuration for storage when not in use. Further objectives of the invention are to provide a snugly-fitting and asthetically pleasing steering wheel cover that, when applied to a steering wheel, creates a relatively flat surface on the face of the steering wheel for display of a decorative design or advertising.

Features

In the accomplishment of the foregoing objectives, the invention is a steering wheel cover comprising a cover member having an attachment means for removably attaching the steering wheel cover to a steering wheel. The steering wheel cover is preferably circular and is of sufficient size to substantially cover the steering wheel when the steering wheel cover is placed upon the steering wheel. The attachment means is adjustable to allow for a snug fit of the steering wheel cover to different sizes of steering wheels, and, once properly adjusted to fit a particular size steering wheel, allows for placement and removal of the steering wheel cover to the steering wheel without altering the adjustment setting.

In the illustrated embodiment, the adjustment means is a collapsible tubular member which is attached to the peripheral edge of the cover member, inside of which is threaded an elastic shock cord. The length of the shock cord can be adjusted, through the use of a barrel lock through which the shock cord is threaded, to various lengths to fit the steering wheel cover to different sizes of steering wheels. Once the shock cord has been adjusted to produce a snug fit of the steering wheel cover to a particular size steering wheel, the inherent elasticity of the shock cord allows for the steering wheel cover to be placed upon and removed from the steering wheel without altering the location of the barrel lock, thereby leaving the adjustment setting unaltered.

Preferably, the steering wheel cover, when in place on the steering wheel, fits snugly over the steering wheel and forms a substantially smooth circular surface on the face of the steering wheel. Decorative designs or advertising can be placed upon this surface. The cover member and collapsible tubular member are preferably made of pliable and washable fabrics. In the illustrated embodiment, the cover member is constructed of two layers, an outer layer of nylon and an inner layer of a thermally insulating fabric, and the tubular member is attached to the peripheral edge of the cover member by stitching.

THE DRAWING

FIG. 3b is a sectional view of the relative placement of the parts of the invention during stitching to obtain the first alternative for stitching illustrated in FIG. 3a;

Figure 2:
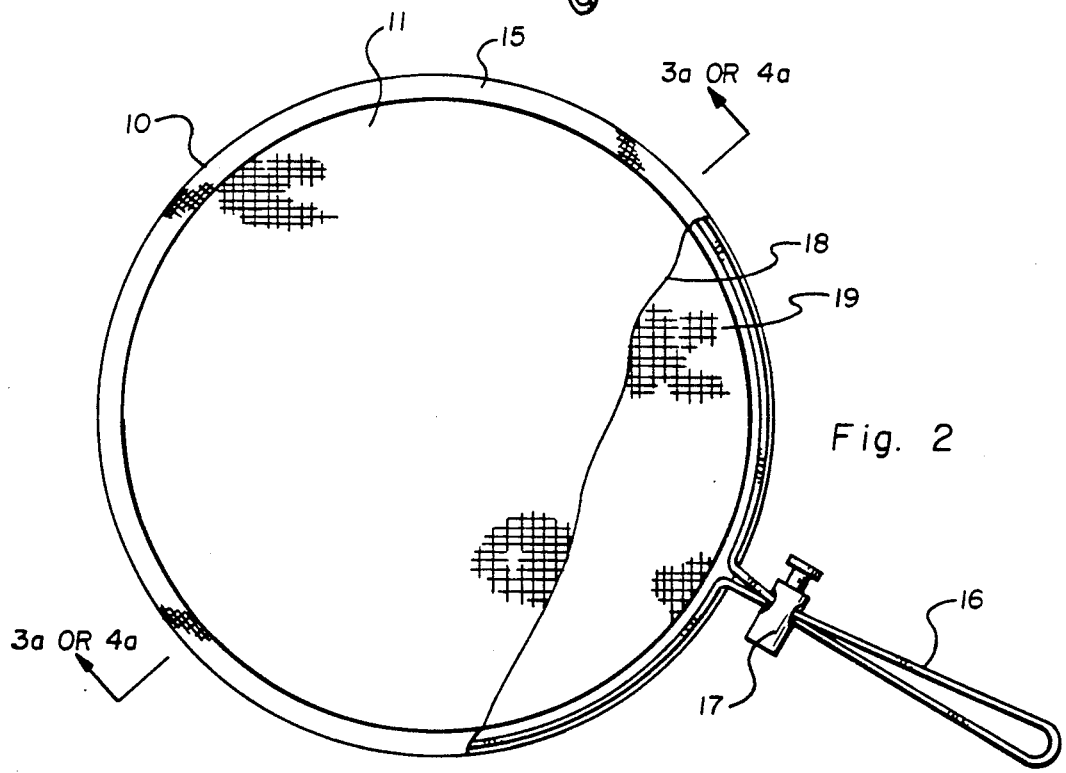
FIG. 2 is a top view of the illustrated embodiment of the invention extended flat in a single plane, with a cut away view detailing internal structure.
Figure 4A:
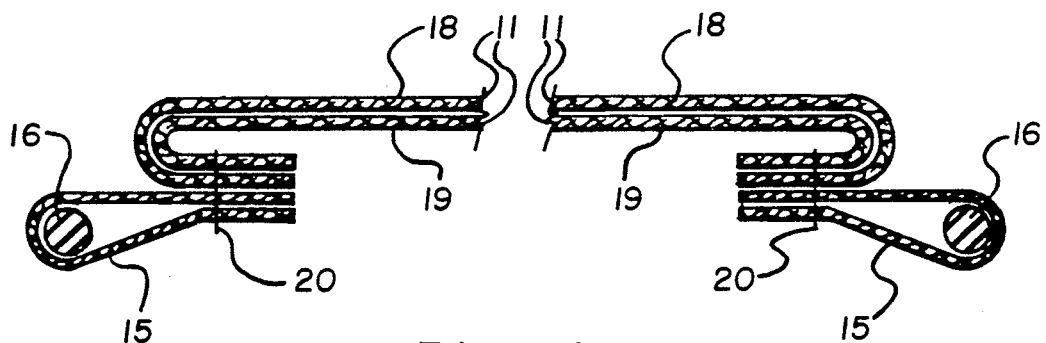
Figure 4B:
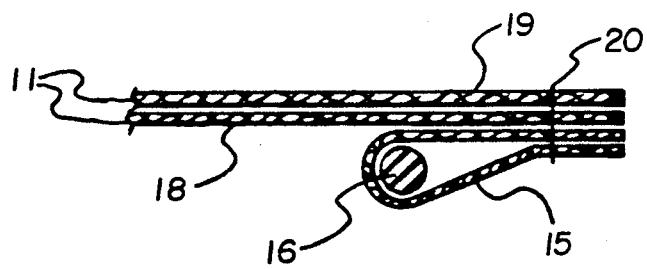

FIG. 4a is a vertical section taken along line 4a-4a of FIG. 2 in which the center portion of the vertical section is compressed and the outer portions are enlarged for purposes of detailed illustration of a second alternative for stitching; and FIG. 4b is a sectional view of the relative placement of the parts of the invention during stitching to obtain the second alternative for stitching illustrated in FIG. 4a.

DETAILED DESCRIPTION OF THE ILLUSTRATED EMBODIMENT

Figure 1:
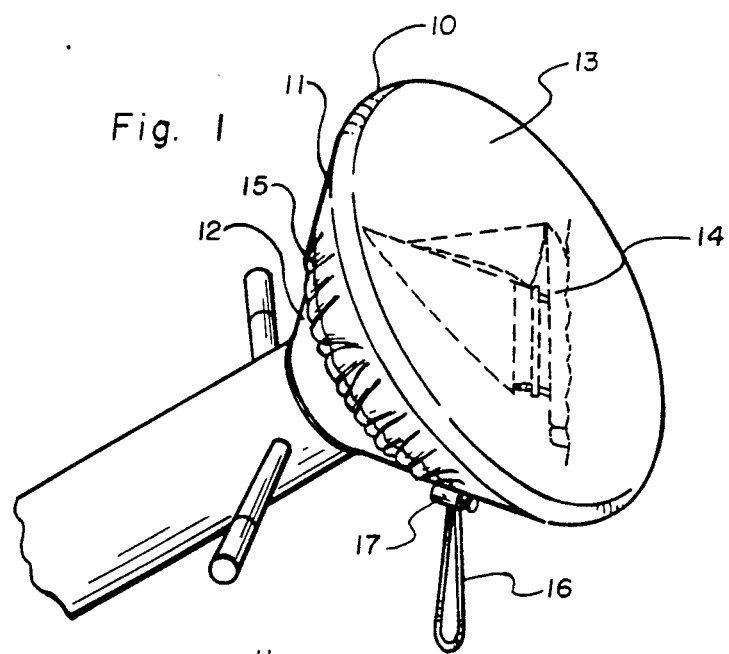
FIG. 1 is a perspective view of the illustrated embodiment of the invention installed upon a steering wheel.

Referring to FIG. 1 and FIG. 2, steering wheel cover 10 comprises a cover member 11 which is of sufficient size to substantially enclose a steering wheel 12 when steering wheel cover 10 is placed upon steering wheel 12 and an attachment means for removably attaching steering wheel cover 10 to steering wheel 12. When steering wheel cover 10 is properly installed over steering wheel 12, it preferably fits snugly to form a relatively smooth surface 13 on the face of steering wheel 12. Relatively smooth surface 13 can be used as an area upon which to place a decorative design 14 or commercial advertising.

Steering wheel cover 10 is preferably circular in shape and of sufficient diameter to substantially enclose steering wheel 12. Preferably, the attachment means is attached to the peripheral edge of cover member 11 and has an adjustment means for adjusting steering wheel cover 10 to fit different sizes of steering wheels. In the illustrated embodiment, the adjustment means comprises a collapsible tubular member 15 attached to the peripheral edge of cover member 11, through which an elastic member is threaded. Preferably, the elastic member is a shock cord 16, the length of which can be changed by a barrel lock 17 through which shock cord 16 is threaded. Once shock cord 16 has been adjusted to the desired length to cause a snug and contured fit of steering wheel cover 10 to a particular size steering wheel, the inherent elasticity of shock cord 16 allows for the removal and replacement of steering wheel cover 10 on and off of steering wheel 12 without altering the location of barrel lock 17 on shock cord 16, thereby leaving the adjustment setting of the length of shock cord 16 unaltered.

Referring to FIG. 2, FIG. 3a, FIG. 3b, FIG. 4a and FIG. 4b, it is preferable that cover member 11 is constructed of an outer layer 18 and an inner layer 19. Preferably, outer layer 18, inner layer 19, and collapsible tubular member 15 are made of pliable, durable and washable materials, such as fabrics woven of nylon and nylon/polyester blends. Preferably, outer layer 18 and collapsible tubular member 15 are constructed of fabric which is 100% nylon, such as that sold under the trademark SUPPLEX, and inner layer 19 is constructed of a thermally insulative fabric of a 50% cotton and 50% polyester blend, such as that sold under the trademark THERMASUEDE which is used in the drapery industry.

Referring to FIG. 3a, FIG. 3b, FIG. 4a and FIG. 4b, collapsible tubular member 15 is preferably attached to cover member 11 through stitching 20. Preferably, stitching 20 is designed such that it is not seen when steering wheel cover 10 is in place upon steering wheel 12.

Figure 3A:
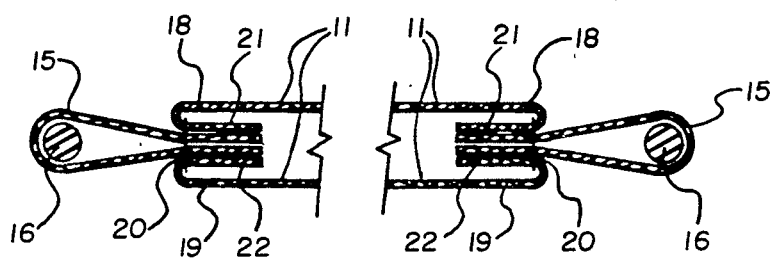
FIG. 3a is a vertical section taken along line 3a-3a of FIG. 2 in which the center portion of the vertical section is compressed and the outer portions are enlarged for purposes of detailed illustration of a first alternative for stitching.
Figure 3B:
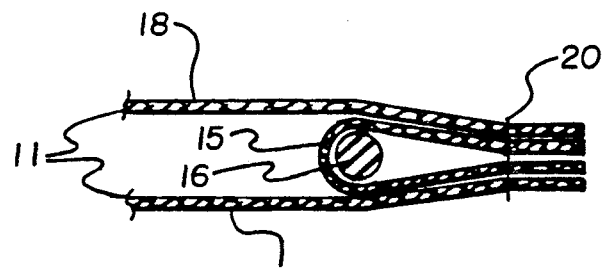

FIG. 3a and FIG. 3b illustrate a first alternative for attaching cover member 11 to collapsible tubular member 15 through stitching 20. FIG. 4a and FIG. 4b illustrate a second alternative for attaching cover member 11 to collapsible tubular member 15 through stitching 20. Each of these alternatives are explained separately in the paragraphs which follow.

Referring to FIG. 3b, a portion of collapsible tubular member 15 is sandwiched between outer layer 18 and inner layer 19. Stitching 20 is then sewn through outer layer 18, collapsible tubular member 15 and inner thereby attaching collapsible tubular member 15 to cover member 11, which is a composite of outer layer 18 and inner layer 19.

Referring to FIG. 3a, cover member 11 is then turned inside out, thereby folding the peripheral edge of outer layer 18 back upon itself to form an outer layer-inwardly projecting flap 21, which is positioned adjacent to collapsible tubular member 15, and folding the peripheral edge of inner layer 19 back upon itself to form an inner layer-inwardly projecting flap 22, which is also positioned adjacent to collapsible tubular member 15. Since turning cover member 11 inside out requires the leaving of a small section of fabric to be unstitched, final stitching and attachment of cover member 11 to collapsible tubular member 15 is accomplished by a small portion of external stitching, after cover member 11 has been turned inside out.

To avoid the steps and labor costs of manually turning cover member 11 inside out and external stitching, an alternative method of assembly and stitching can be utilized, as illustrated in FIG. 4a and FIG. 4b. Referring to FIG. 4b, outer layer 18 is sandwiched between inner layer 19 and collapsible tubular member 15. Stitching 20 is then sewn through inner layer 19, outer layer 18 and collapsible tubular member 15, thereby attaching collapsible tubular member 15 to cover member 11, which is a composite of outer layer 18 and inner layer 19. Referring to FIG. 4a, the peripheral edges of outer layer 18 and inner layer 19 are folded back upon themselves to achieve the illustrated configuration of FIG. 4a in which stitching 20 is seen only from the inside of steering wheel cover 10. In this stitching configuration, stitching 20 is preferably formed through the use of serger chain lock stitching from multiple thread differential feeds.

Whereas this invention is here illustrated and described with specific reference to an embodiment thereof presently contemplated as the best mode in carrying out such invention, it is to be understood that various changes may be made in adapting the invention to different embodiments without departing from the broad inventive of concepts disclosed herein and comprehended by the claims that follow.

I claim:

1. A steering wheel cover comprising:

(a) a substantially circular cover member formed of a pliable material having a peripheral edge which is of sufficient diameter to substantially enclose a steering wheel and which cover member comprises an outer layer of substantially smooth fabric and an inner layer of a thermally insulative fabric;

(b) an elastic member slidably attached to the peripheral edge of the cover member for removable placement of the cover member over the steering wheel wherein the elastic member is attached to the peripheral edge of the cover member by sliding the elastic member through a compressible tubular member which is formed at the peripheral edge of the cover member by attaching the outer layer, inner layer and tubular member to each other wherein a peripheral edge of the outer layer is sandwiched between a peripheral edge of the inner layer and an edge of the tubular member; and (c) a locking means placed on the elastic member for adjusting the length of the elastic member to fit the cover member to different sizes of steering wheels and wherein the cover member, after being adjusted to fit a particular size of steering wheel, can be removed from the steering wheel without alteration of the position of the locking means.

2. A steering wheel cover as recited in claim 1 wherein the outer layer, inner layer and tubular member are attached to each other by stitching.

3. A steering wheel cover as recited in claim 2 wherein the stitching is serger chain lock stitching from multiple thread differential feed.

4. A steering wheel cover as recited in claim 3 wherein the cover member, elastic member and locking means are washable.

5. A steering wheel cover as recited in claim 4 wherein the elastic member is a shock cord and the locking means is a barrel lock.

6. A steering wheel cover comprising:

(a) a substantially circular cover member formed of a pliable material having a peripheral edge which is of sufficient diameter to substantially enclose a steering wheel and which cover member comprises an outer layer of a substantially smooth fabric and an inner layer of a thermally insulative fabric;

(b) an elastic member slidably attached to the peripheral edge of the cover member for removable placement of the cover member over the steering wheel wherein the elastic member is attached to the peripheral edge of the cover member by sliding the elastic member through a compressible tubular member which is formed at the peripheral edge of the cover member by attaching the outer layer, inner layer and tubular member to each other wherein an edge of the tubular member is sandwiched between a peripheral edge of the outer layer and a peripheral edge of the inner layer; and (c) a locking means placed on the elastic member for adjusting the length of the elastic member to fit the cover member to different sizes of steering wheels and wherein the cover member, after being adjusted to fit a particular size of steering wheel, can be removed from the steering wheel without alteration of the position of the locking means.

7. A steering wheel cover as recited in claim 6 wherein the outer layer, inner layer and tubular member are attached to each other by stitching.

8. A steering wheel cover as recited in claim 7 wherein the stitching is serger chain lock stitching from multiple thread differential feed.

9. A steering wheel cover as recited in claim 8 wherein the cover member, elastic member and locking means are washable.

10. A steering wheel cover as recited in claim 9 wherein the elastic member is a shock cord and the locking means is a barrel lock.

* * * * *